United States Patent

[11] 3,569,959

[72] Inventors Shingo Arase;
James B. Briggs, Los Angeles, Calif.

[21] Appl. No. 557,509
[22] Filed June 14, 1966
[45] Patented Mar. 9, 1971

[73] Assignee Hoffman Electronics Corporation
El Monte, Calif.

[54] DIGITAL TO ANALOGUE SERVOSYSTEM
18 Claims, 3 Drawing Figs.

[52] U.S. Cl. .......... 340/347, 235/150.5
[51] Int. Cl. .......... H03k 13/04
[50] Field of Search .......... 340/347; 318/20.255, 20.260; 235/150.5, 197

[56] References Cited

UNITED STATES PATENTS

| | | | |
|---|---|---|---|
| 2,922,991 | 1/1960 | Frank | 318/20.255 |
| 3,226,617 | 12/1965 | Smith et al. | 340/347 |
| 3,419,853 | 12/1968 | Silverman | 235/150.5 |
| 3,345,505 | 10/1967 | Schmid | 235/197 |
| 3,067,940 | 12/1962 | Preston | 235/150.5 |

*Primary Examiner*—Maynard R. Wilbur
*Assistant Examiner*—Jeremiah Glassman
*Attorney*—Lyon and Lyon

ABSTRACT: There is disclosed herein a digital to analogue converter particularly useful in radio air navigation systems. The converter includes a ladder network of weighted impedances having an output coupled to an amplifier for providing a fine analogue output, and having an output for providing a coarse and fine output. Also disclosed is a servosystem which may include the converter as its input to receive the digital information, and which includes fine and coarse servoloops. One of the loops includes a motor for driving output gearing which serves to intercouple the loops mechanically to provide a precision output and to provide feedback for each of the two loops. The ladder network includes electrically weighted networks providing a predetermined electrical ratio with respect to the digital inputs, and the mechanical intercoupling of the servoloops includes gearing having a ratio proportional to the electrical ratio. Additionally, a potentiometer circuit including potentiometers and switching means coupled therewith is disclosed which enables the potentiometers to rotate continuously and eliminate transients occasioned by the potentiometer wipers crossing the resistive gaps thereof.

SHINGO ARASE
JAMES B. BRIGGS
INVENTORS.

BY Lyon & Lyon
ATTORNEYS

SHINGO ARASE
JAMES B. BRIGGS
INVENTORS.

BY Lyon & Lyon
ATTORNEYS

DIGITAL TO ANALOGUE SERVOSYSTEM

This invention relates to a digital to analogue servosystem and more particularly to a fine and coarse servosystem for digital to analogue conversion.

Digital to analogue conversion pertains to the translation of digital data into an analogue form. Although various systems are used for performing conversion of this nature, typically a digital register responsive to input digital data operates a resistive divider network which in turn provides an analogue output proportional to the digital data. The divider network is weighted such that each bit of digital data applied to the register contributes to the output voltage in proportion to its digital value. Such converters are used in various applications where it is desired to convert digital data into analogue information. Some applications require that the conversion be performed as accurately as possible in order that the analogue information may be precisely, or closely so, proportional to the input digital data.

Accordingly, it is an object of the present invention to provide an improved digital to analogue converter.

It is a further object of the present invention to provide a digital to analogue converter for converting digital data to both fine and coarse analogue information.

It is an additional object of the present invention to provide an improved digital to analogue servosystem having both fine and coarse servoloops.

Another object of the present invention is to provide a novel potentiometer circuit particularly adaptable for use in a digital to analogue servosystem.

These and other objects and advantages of the present invention will become more apparent upon reference to the accompanying description and drawing in which.

In an illustrative embodiment of the concepts of the present invention, a digital to analogue converter including a ladder network of weighted resistances is provided and includes at least one tap and an amplifier for providing a fine output, as well as a coarse output. A digital to analogue servosystem, which may include the converter as its input to receive the digital information, is provided and includes fine and coarse servoloops. One of the loops includes a motor for driving output gearing which serves to intercouple the loops mechanically to provide a precision output and to provide feedback for each of the two loops. Additionally, a potentiometer circuit including potentiometers and switching means coupled therewith is provided to enable the potentiometers to rotate continuously and eliminate transients occasioned by the potentiometer wipers crossing the resistive gaps thereof.

Although the present invention is susceptible of various applications, it is particularly useful in radio air navigation systems which provide range and/or bearing information digitally. In this particular application, the present invention may be used to convert digital range or bearing output signals to an analogue shaft position, and thus to electrical signals from a potentiometer or synchro-type device if desired, for providing an indication of the respective range or bearing on a conventional indicator carried by the airplane. In this regard, the present invention is particularly useful with the systems disclosed in U.S. Pat. application Ser. No. 557,559, now U.S. Pat. No. 3,354,455 entitled "Digital Delay Measurement System" filed concurrently herewith by James B. Briggs and Marvin P. Vander Plaats, and U.S. Pat. application Ser. No. 557,441 entitled "Phase Angle Measurement System" filed concurrently herewith by James B. Briggs, both of which are assigned to the assignee of the present application. Briefly, the first of these copending applications discloses a time delay measurement system which may be used for range measurements in a navigation system, and the second application relates to a phase angle measurement system useful in bearing measurements in a navigation system. The system discussed in each of these applications, the disclosures of which are incorporated herein by reference, provide a digital or binary output indicative of the measurement results, i.e., respectively range or bearing.

Figure 1:
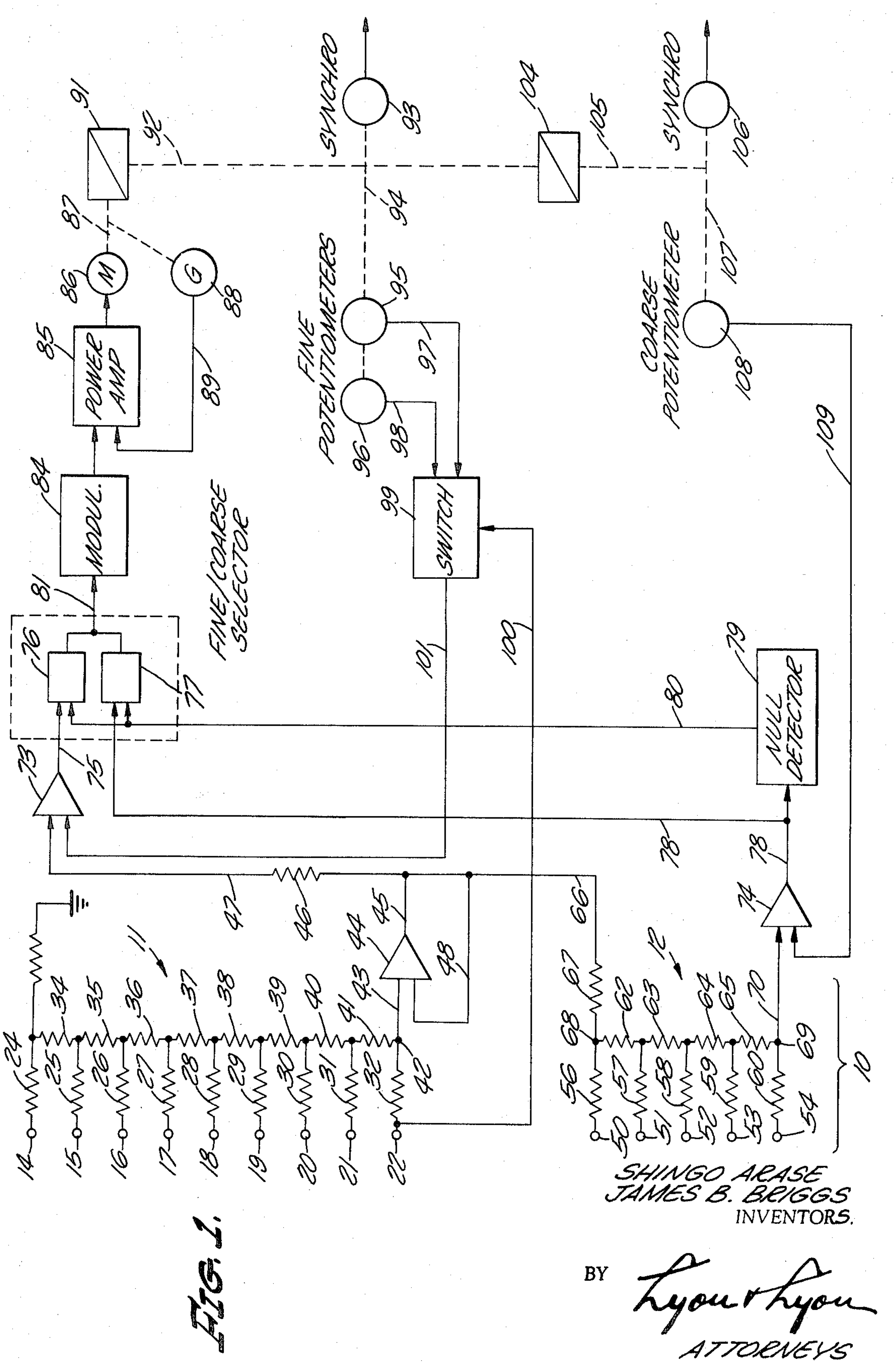
FIG. 1 illustrates a system according to the present invention.

Turning to FIG. 1, a digital to analogue converter 10 includes respective "fine" and "coarse" ladder networks 11 and 12 with weighted resistances. The fine network 11 includes input terminals 14 through 22 connected to respective resistances 24 through 32, the other ends of which are connected with resistances 34 through 41. Thus, the ends of the resistances 24 and 25 remote from the respective terminals 14 and 15 are connected to the ends of the resistance 34, the ends of the resistances 25 and 26 remote from the respective terminals 15 and 16 are connected with the resistance 35, and so forth. The resistances 34 through 41 may have a resistive weight of $R$, and the resistances 24 through 32 have a resistive weight of $2R$. A resistance having a weight of $2R$ is connected from the junction of resistors 24 and 34 to ground. A terminal 42 provides an output terminal for the fine ladder network 11. However, any of the taps between the resistances 34 through 41 may be used as an output for a fine ladder network 11, and the particular tap employed depends upon the number of input binary bits to be applied to input terminals 14 through 22.

The terminal 42 is connected through a line 43 to one input of a unity gain noninverting differential amplifier 44. The output of the amplifier 44 is connected through a line 45 and a resistance 46 to a "fine" output line 47. The resistance 46 is weighted $R$. Unity gain is provided by a feedback line 48 connected from the output of the amplifier 44 to a second input thereof. The amplifier 44 preferably has a high input impedance and a zero, or very low, output impedance.

The coarse ladder network 12 includes input terminals 50 through 54 connected to respective input resistances 56 through 60. The ladder network is completed by resistances 62 through 65 which are connected to the other ends of the resistances 56 through 60. That is, the ends of the resistances 56 and 57 remote from the respective input terminals 50 and 51 are connected across the resistance 62, the remote ends of the resistances 57 and 58 connected across the resistance 63, etc. The resistances 62 through 65 are weight $R$, and the resistances 56 through 60 are weighted $2R$.

The output of the differential amplifier 44 is connected through a line 66 and a resistance 67 to a terminal 68 between the resistances 56 and 62. The resistance 67 is weighted $2R$. The line 66 and resistance 67 apply a fine output signal to the coarse ladder network 12. An output terminal 69 connected between the resistances 60 and 65 is connected to a "coarse" output line 70. Depending upon the number of input bits applied to the input terminals 50 through 54, any of the taps between the resistances 62 through 65 may be used as an output terminal. Furthermore, fewer or more weighted resistances may be used in either ladder network 11 or 12 to shorten or extend the range thereof.

If the terminal 42 on the fine ladder network were connected through a resistance weighted $R$ to the terminal 68 of the coarse network 12 to form one continuous ladder network, and a fine output tap connected to one of the terminals between the resistances 34 through 41 an accurate fine output signal would not result because it would be influenced by all digital inputs, i.e., including those applied to input terminals 50 through 54. The arrangement illustrated with the differential amplifier 44 provides a fine output signal on the line 47 which is not affected by digital inputs applied to input terminals 50 through 54. However, the application of the output of the differential amplifier 44 through the resistance 67 to the coarse ladder network 12 enables the coarse output line 70 to include both fine and coarse information. The resistance 46 on the output of the amplifier 44 enables both the fine and coarse outputs on the respective lines 47 and 70 to have the same output impedance.

When digital information is applied to the input terminals 14 through 22 and 50 through 54, the output line 70 provides an analogue signal proportional thereto; whereas the line 47 provides an analogue signal proportional only to the inputs applied to the fine input terminals 14 through 22. The most significant bit of the digital information is applied to the terminal 54, with the terminal 14 receiving the least significant bit.

For converting digital range information, such as derived from the system described in the aforementioned Briggs and Vander Plaats application, the digital information applied to the respective terminals 14 through 22 typically may represent ranges of 1/40, 1/20, 1/10, 1/5, 2/5, 4.5, 1.6 3.2 and 6.4 miles, with the input terminals 50 through 54 receiving respective digital inputs representative of 12.8, 25.6 51.2, 102.4 and 204.8 miles. In converting binary bearing information, such as that which may be derived by the system described in the aforementioned Briggs application, five fine inputs 18 through 22 may be used to receive digital information representative of ¼, ½ 1, 2 and 4°, with the coarse network 12 including six digital inputs representing 8, 16, 32, 64, 128 and 256°.

The digital to analogue servosystem shown in FIG. 1 has fine and coarse servoloops including respective input fine and coarse differential amplifiers 73 and 74. The fine and coarse output lines 47 and 70 from the converter 10 are connected to inputs of the respective amplifiers 73 and 74. The amplifier 73 has an output line 75 connected to an input of a fine/coarse selector which includes a pair of analogue gates 76 and 77, and the amplifier 74 has an output line 78 connected to another input of the selector and to a null detector 79. Thus, the line 75 is connected to the gate 76 and the line 78 is connected to the gate 77. The gates 76 and 77 may be model E16–501 analogue gates sold by Amelco Semiconductor Co. An output of the null detector 79 is connected through a line 80 to both the gates 76 and 77 to control the operation of the selector. The output lines from the gates 76 and 77 are connected together to provide output signals on a line 81.

The null detector 79 is a level detector which detects the coarse error output signal from the amplifier 74 and controls the selector to pass the coarse error signal to the output line 81 as long as the coarse error signal is greater than a preselected minimum absolute value. Thus, the null detector 79 may be a comparator amplifier which compares its input to ground or a set voltage level. The fine/coarse selector is essentially a double throw switch, and the analogue gates 76 and 77 operate to pass either the input signal applied on the line 75 or the input signal applied on the line 78 to the output line 81 depending upon the control signal applied thereto from the null detector 79 on the line 80. For example, the null detector 79 may provide a predetermined voltage output on the line 80 as long as the coarse error signal from the amplifier 74 is above a predetermined value to cause the selector to pass the coarse error signal on the line 78 to the output line 81. If the coarse error signal on the line 78 falls below this predetermined value, the output of the null detector 80 goes to another value (such as zero or a low voltage) to cause the selector to pass the fine error signal on the line 75 to the output line 81. In this manner, the coarse error signal on the line 78 is passed to the output line 81 as long as this error signal is large. When this error signal becomes small, that is goes below a predetermined level, the fine error signal on the line 75 is passed to the output line 81 to allow more accurate servo positioning as will be described subsequently.

The line 81 is connected to a conventional D.C chopper amplifier, including a modulator 84 and power amplifier 85, to drive a servomotor 86. Stabilizing feedback is provided by connecting the output shaft 87 of the motor 86 to a generator 88 which in turn provides electrical feedback through a line 89 to an input of the power amplifier 85. The output shaft 87 of the motor 86 is connected through gearing 91 to a shaft 92. The gearing 91 is stepdown gearing to provide mechanical advantage. The motion of the shaft 92, which is a "fine" analogue signal, may be used directly or it may be connected to a synchro transmitter 93 to provide an electrical analogue output, if desired. The shaft 92 is connected to a shaft 94 to provide fine feedback. The shaft 94 thus may be connected to a movable wiper of fine potentiometers 95 and 96, or the like, the electrical output of which is applied as a feedback signal to an input of the differential amplifier 73.

In accordance with a feature of the present invention the potentiometers 95 and 96 may be a pair of potentiometers, the electrical outputs of which are connected through respective lines 97 and 98 to a switch 99. The switch 99 is controlled by the input signal on terminal 22 applied by a line 100 to the input of the switch 99. The output of the switch is connected through a line 101 to another input of the differential amplifier 73. The switch 99 operates to select either the output 97 or the output 98 of the respective potentiometers 95 and 96, and apply the voltage thereof through the line 101 to the differential amplifier 73. As will appear subsequently, this potentiometer and switching arrangement enables the use of conventional potentiometers which have a resistive gap at the ends thereof passed by the potentiometer wiper upon rotation thereof without generating the usual transients associated with this type of operation. However, a single conventional potentiometer having a very narrow gap may be used, with the output thereof connected directly to the line 101, if the transients involved are not significant in the intended application of the servosystem.

The shaft 92 also is connected through stepdown gearing 104 to a shaft 105 to provide a mechanical "coarse" output. The shaft 105 is connected through a shaft 107 to drive the movable wiper of a coarse feedback potentiometer 108. The wiper of the potentiometer 108 is electrically connected through a line 109 to another input of the differential amplifier 74, in a conventional manner.

The gear ratio of the gearing 104 between the respective fine and coarse feedback shafts 94 and 107 is selected to be the same as the digital ratio between the respective fine and coarse ladder networks 11 and 12 in the analogue to digital converter 10. For example, for navigation bearing use where the fine input digital data may represent 8° and the coarse input represent 360°, the gear ratio may be 45 to 1. For range indications where the fine input may be 12.8 miles and the coarse input 320 miles, the ratio may be 25 to 1. This arrangement, along with the fine/coarse selector and null detector 79 enables the use of the single motor 86 and driving amplifier therefor to provide the mechanical output rather than a pair of fine and coarse motors and controls therefor. It will be appreciated that the coarse shaft 105 provides a mechanical output proportional to the input digital data applied to input terminals 14 through 22 and 50 through 54 of the converter 10; whereas the shaft 92 provides a fine output proportional to the digital inputs on terminals 14 through 2 of the converter 10. The electrical feedback signals applied through the feedback lines 101 and 109 to the respective inputs of the amplifiers 73 and 74 cause the error outputs of these respective amplifiers to approach zero in a conventional manner thereby causing positioning of the shafts 94 and 107, and the potentiometers connected thereto, proportional to the input voltages applied to the inputs of the amplifiers 73 and 74.

Figure 2:
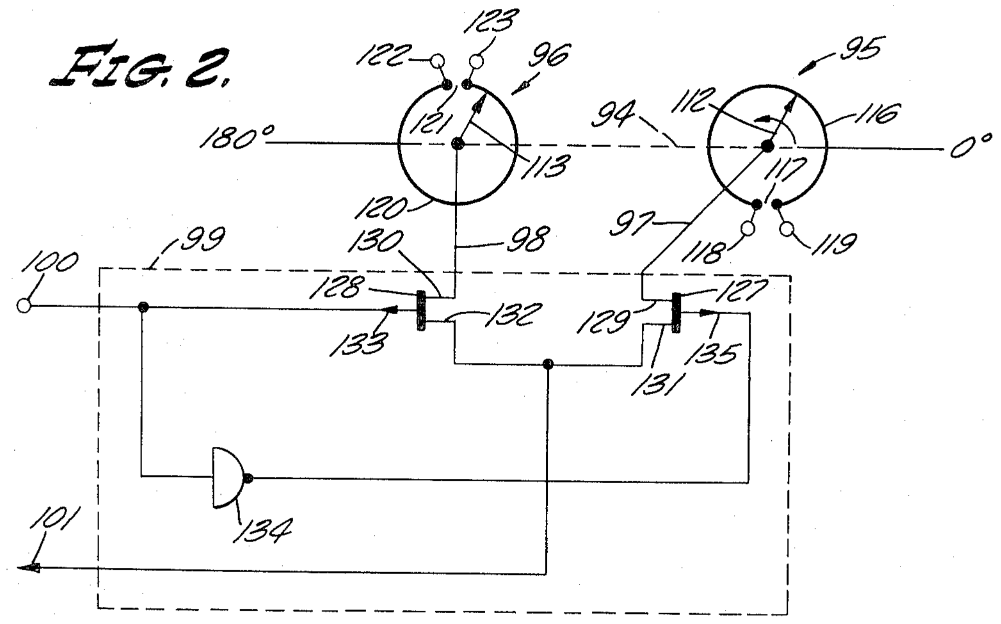
FIG. 2 illustrates a potentiometer circuit which may be used in the system of FIG. 1.

FIG. 2 illustrates a potentiometer circuit. This circuit is particularly useful in deriving the fine feedback signal applied through the line 101 to the amplifier 73 because the fine feedback shaft 94 may rotate through a considerable range greater than 360°, i.e., rotate a number of revolutions. Typically, the coarse feedback shaft 107 does not rotate more than 360° and the potentiometer circuit of FIG. 2 is not necessary therefor. However, the circuit shown in FIG. 2 is suitable for various applications in which a potentiometer wiper must pass the resistive gap thereof.

The fine feedback shaft 94 of FIG. 1 is connected to drive movable wipers 11 and 113 of respective potentiometers 95 and 96. The potentiometer 95 includes a resistive element 116 arranged substantially in a circle, the ends of which form a gap 117 and are connected to output terminals 118 and 119. The potentiometer 96 is substantially identical to the potentiometer 95 and includes a resistive element 120 having a gap 121 at the ends which are connected to terminals 122 an 123. A source of voltage is connected to the terminals 118, 119 and 122, 123 in a conventional manner. The potentiometers 95 and 96 have the resistive elements 116 and 120 thereof fixed stationary with the respective gaps 117 and 121 displaced from one another, preferable 180°. Lines 97 and 98 are connected from the respective wiper 112 and 113 to the switch 99. The switch 99 functions to connect one of the lines 97 or 98 to the output line 101 when the respective wiper 112 or 113 associated therewith is away from the gap 117 and 121, respectively.

The switch 99 includes a pair of field effect transistors 127 and 128. The lines 97 and 98 are connected to source electrodes 129 and 130 of the respective transistors 127 and 128, and drain electrodes 131 and 132 thereof are connected together and to the output line 101. Control line 100 is connected to the gate electrode 133 of the transistor 128, and connected through an inverting device 134 to the gate electrode 135 of the transistor 127. The inverting device 134 may be an OR gate having an inverting output as shown, or a unity gain inverting amplifier.

It will be seen that the switch 99 is controlled from the most significant input terminal 22 of the fine ladder network 11. With this arrangement, wherever the most significant fine bit (that bit of information applied to input terminal 22) is true or a one, the transistor 128 is turned on thereby connecting the wiper 113 through the line 98, the electrodes 130 and 132 of the transistor 128, and a line 101 to the input of the amplifier 73 in FIG. 1. The OR gate 134 inverts this input and, thus, the transistor 127 is off. When the most significant bit applied to the terminal 22 is false, this false signal is inverted by the OR gate 134 and turns on the transistor 127. When the transistor 127 is turned on, the wiper 112 is connected through the line 97, the electrodes 129 and 131 of the transistor 127, and the line 101 to the input of the amplifier 73 in FIG. 1. In this manner, the outputs of the fine feedback potentiometers 95 and 96 are switched between the wipers 112 and 113 so that between a shaft angle of 0 and 180° the output of the wiper 112 is used; whereas between 180° and 360°, the output of the wiper 113 is used. It will be appreciated that switching may occur at other angular positions, the only requirement being that the output of either potentiometer not be used as its wiper passes the gat therein. Also, it will be appreciated that other arrangements may be provided for driving the transistors 127 and 128, such as from the complimentary outputs of a flip-flop.

Figure 3:
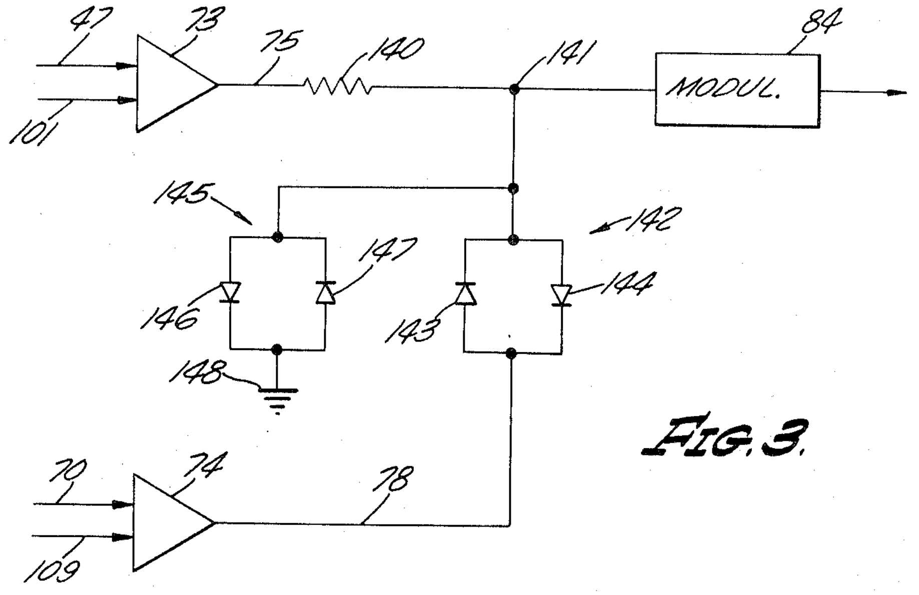
FIG. 3 illustrates a modification of the system of FIG. 1.

FIG. 3 illustrates an alternative arrangement for the null detector and fine/coarse selector of FIG. 1. The output of the amplifier 73 is connected through a resistance 140 to a terminal 141 which is connected to the input of the modulator 84. The output line 78 of the amplifier 74 is connected through a diode network 142 including oppositely poled diodes 143 and 144 to the terminal 141. The terminal 141 is connected through another diode network 145 including oppositely poled diodes 146 and 147 to ground 148.

When the coarse error from the amplifier 74 is large (positive or negative) the diode networks 142 and 145 conduct to ground placing an error voltage on the terminal 141, and the output of the amplifier has no effect. The maximum error in this case is one diode voltage drop (diode 146). If the output of the amplifier 74 is below a predetermined level, the networks 142 an 145 do not conduct and the fine error from the amplifier 73 is passed to the modulator 84. The gain of the amplifier 74 is selected so that when the maximum tolerable error voltage appears at its input, its output reaches the voltage which will bias the diode networks to ground (i.e., turn on either diodes 143 and 146 or diodes 144 or 147). The terminal 141 in this case is shorted to ground through one of the diodes 146 or 147 depending on the polarity of the voltage output of the amplifier 74, and the fine amplifier 73 has no effect. The error signal at the terminal 141 is one diode voltage drop (± Vd), and because of the resistance 140 the output of the amplifier 73 has no effect. Zener diodes may be used if a higher error voltage is desired. When the error signal at the input or amplifier 74 is less than the maximum tolerable, the voltage on the line 78 is too low to turn on the diodes and thus this line is essentially disconnected from terminal 141. In this latter case, the error is controlled by the fine amplifier 73.

As mentioned previously, the system shown in FIG. 1 may be used for accurately converting digital information to analogue information. For example, digital signals representative of range or bearing derived from either of the systems of said copending applications may be applied to input terminals 14 through 22 and 50 through 54 and converted to analogue information at output shafts 92 and 105. The shafts 92 and 105 may be coupled directly to mechanical indicators. Likewise, shafts 9 and 105 may be coupled to respective synchro transmitters 93 and 106, or to output potentiometers, to provide electrical analogue output signals.

The ladder networks 11 and 12 of the digital to analogue converter 10 are particularly susceptible to manufacture by thin film techniques. One standard ladder network having a size the same as, or greater than, the combined ladder networks 11 and 12 may be manufactured in a thin film structure, with a gap between adjacent resistances being provided. That is, the network 11 may have a gap between the resistance 34 and the resistances 25, 35, a gap between the resistance 36 and the resistances 26, 36, etc. In this manner, jumpers may be connected across certain of the gaps in the completed structure to provide sections or networks 11 and 12 of any desired size. Likewise, the resistances 46 and 67 may be unused resistances of the completed structure, such as resistances similar to respective resistances 62 and 56. Thus a relatively simple converter may be provided having ladder networks tapped at any desired point without the requirement of providing many ladder networks of diverse sizes for various applications.

While the present invention has been described in connection with use in a radio air navigation system, it should be understood that of the applications are possible. The invention, therefore may be embodied in other forms not departing from the spirit or central characteristics thereof. (The present embodiments are to be considered in all respects as illustrative and not restrictive, the scope of the invention being indicated by the appended claims rather than by the foregoing description and all changes which come within the meaning and range of equivalency of the claims are therefore intended to be embraced thereby.

We claim:

1. A digital to analogue converter comprising:

an impedance ladder network means having a plurality of inputs for receiving fine and coarse digital information and providing output signals proportions thereto, said ladder network means including a first section having a plurality of interconnected weighted impedances and an analogue output terminal for providing a fine analogue output proportional to the fine digital input to said first section, and a second section having a plurality of interconnected weighted impedances for receiving said coarse digital information and having an analogue input terminal and an analogue output terminal; and unity gain noninverting amplifier means having an input connected with the analogue output terminal of said first section for receiving said fine analogue output signals and having an output coupled with the analogue input of said second section for applying said fine analogue output signals as an input to said second section, the output of said amplifier providing said fine analogue output as an output signal and said analogue output of said second section providing analogue output signals proportional to said fine and coarse digital information.

2. A digital to analogue converter comprising:

an impedance ladder network means having a plurality of inputs for receiving digital information and including a first section having a plurality of interconnected weighted impedances and an analogue output terminal, and a second section having a plurality of interconnected weighted impedances having an analogue input terminal and an analogue output terminal;

said first section including a first group of weighted impedances having their first ends connected to a first group of said inputs for receiving digital information and their second ends connected to a first group of taps, and a second group of weighted impedances each connected between respective taps, with one of said taps providing analogue output terminal of said first section;

said second section including a first group of weighted impedances having their first ends connected to a second group of said inputs for receiving digital information and their second ends connected to a second group of taps, and including a second group of weighted impedances connected between respective taps, first and second taps of said second section respectively providing said analogue input and analogue output terminals thereof;

each of the impedances of the first group of weighted impedances of each section having a value twice that of each of the impedances of the second group of weighted impedances of each section; and amplifier means having an input connected with the analogue output terminal of said first section and having an output coupled with the analogue input of said second section, the output of said amplifier and said analogue output of said second section providing analogue outputs for said converter.

3. A converter as in claim 2 wherein said amplifier means includes a feedback amplifier and an impedance coupled to the output thereof weighted the same as each impedance of said first groups of impedances, and the output of said amplifier is connected through an impedance weighted the same as each impedance of said second groups of impedances to the analogue input of said second section.

4. A converter as in claim 3 wherein said weighted impedances are resistances with the resistance of the resistances in said second groups having a value *R* and the resistance of the resistances in said first groups having a value 2*R*.

5. A digital to analogue servosystem comprising:

conversion means having a plurality of input terminals for receiving digital data, said conversion means including electrically weighted networks respectively having first and second analogue output terminals, said networks having a predetermined electrical ration therebetween;

first and second comparison means having first inputs respectively connected with said first and second output terminals of said conversion means, said comparison means providing respective first and second error output signals as a function of input signals applied to said respective first inputs and feedback signals applied to respective second inputs thereof;

switching means connected with the outputs of said first and second comparison means for passing either said first or second error signal to an output thereof;

electrical to mechanical conversion means connected with the output of said switching means for providing a mechanical output;

first and second mechanical to electrical conversion means having electrical feedback outputs respectively connected with said second inputs of said first and second comparison means; and mechanical coupling means coupling the output of said electrical to mechanical conversion means to the mechanical inputs of said first and second mechanical to electrical conversion means, said mechanical coupling means including gearing means providing a gear ratio between the output of said electrical to mechanical conversion means and the mechanical input of said second mechanical to electrical conversion means, said gear ratio being the same as said predetermined electrical ratio.

6. A system as in claim 5 wherein:

said electrical to mechanical conversion means includes amplifier means connected with the output of said switching means for controlling a motor which in turn moves an output shaft; and said output shaft is coupled with the mechanical input of said first mechanical to electrical conversion means, and coupled through said gearing means to the mechanical input of said second mechanical to electrical conversion means.

7. A digital to analogue servosystem comprising:

conversion means having a plurality of input terminals for receiving digital data, and having at least first and second analogue output terminals;

first and second comparison means having first inputs respectively connected with said first and second output terminals of said conversion means, said comparison means providing respective first and second error output signals as a function of input signals applied to said respective first inputs and feedback signals applied to respective second inputs thereof;

switching means connected with the outputs of said first and second comparison means for passing either said first or second error signal to an output thereof, said switching means including a resistance connected between the output of said s first comparison means and a common terminal, a diode network connected between the output of said second comparison means and said common terminal, and a diode network connected between a reference terminal and said common terminal, said common terminal serving as the output of said switching means;

electrical to mechanical conversion means connected with the output of said switching means for providing a mechanical output;

first and second mechanical to electrical conversion means having electrical feedback outputs respectively connected with said second inputs of said first and second comparison means; and mechanical coupling means coupled to the output of said electrical to mechanical conversion means to the mechanical input of said first and second mechanical to electrical conversion means.

8. A digital to analogue servosystem comprising:

conversion means having a plurality of input terminals for receiving digital data and having fine and coarse analogue output terminals, said conversion means including electrically weighted networks having a predetermined electrical ratio therebetween;

first and second comparison means having first inputs respectively connected with said fine and coarse output terminals, said comparison means providing respective first and second error output signals as a function of input signals applied to said respective first inputs and feedback signals applied to respective second inputs thereof;

switching means connected with the outputs of said first and second comparison means for passing either said first and second comparison means for passing either said first or second error signal to an output thereof;

mechanical motion producing means connected with the output of said switching means for providing a mechanical motion output;

first and second variable impedance means providing electrical feedback signals respectively connected with said second inputs of said first and second comparison means, said first variable impedance means including at least first and second variable impedances each having an impedance element with an electrical gap at the ends thereof, said gaps being displaced with respect to each other, and each of said variable impedances having a wiper for contacting the impedance element thereof, said impedance element and wiper of each variable impedance being relatively movable with respect to one another in proportion to said mechanical motion output, and switching means electrically connected to the wiper of said variable impedances, said switching means providing feedback signals to said first comparison means by providing selectable electrical paths between either of said wipers and said first comparison means; and mechanical coupling means responsive to the mechanical motion output of said mechanical motion producing means to control the operation of said variable impedance means, said mechanical coupling means including means for controlling said first variable impedance means, and gearing means for controlling said second variable impedance means, said gearing means having a ratio proportional to said electrical ratio.

9. A system as in claim 8 wherein:

said conversion means includes a first electrically weighted network having a tap, said tap being connected through amplifying means, the output of said amplifying means being coupled through a first weighted impedance to said fine analogue output terminal and through a second weighted impedance to a tap of a second electrically weighted network which includes another tap serving as said coarse analogue output terminal; and said tap of said first network being couple to control the operation of said switching means.

10. A servosystem comprising:

first and second comparison means having first inputs for receiving analogue signals, said analogue signals comprising fine and coarse analogue signals, the maximum values thereof having a predetermined ratio, said comparison means providing respective first and second error output signals as a function of input signals applied to said respective first inputs and feedback signals applied to respective second inputs thereof;

switching means connected with the outputs of said first and second comparison means for passing either said first and second comparison means for passing either said first or second error signal to an output thereof as a function of said second error output signal;

mechanical motion producing means connected with the output of said switching means for providing a mechanical motion output;

first and second variable impedance means providing electrical feedback signals respectively connected with said second inputs of said first and second comparison means; and mechanical coupling means responsive to the mechanical motion output of said mechanical motion producing means to control the operation of said variable impedance means, said mechanical coupling means providing a mechanical coupling ratio between said first and second variable impedance means the same as said predetermined ratio.

11. A digital to analogue servosystem comprising:

conversion means for receiving digital data and providing analogue output signals, said conversion means comprising a pair of electrically weighted networks having input terminals for receiving said digital data and outputs for said analogue signals, the first of said networks serving to receive fine digital information and the second serving to receive coarse digital information, there being a predetermined electrical ratio between said fine and coarse digital information;

amplifier means for receiving fine and coarse analogue information from said conversion means and supplying the same to an output, said amplifier means comprising a first amplifier having a first input for receiving fine analogue signals and a second input for receiving feedback signals, and including a second amplifier having a first input for receiving fine and coarse analogue signals and a second input for receiving feedback signals;

means coupling the output of the first weighted network with the first input of said first amplifier for supplying said fine analogue signals from said first network to said first amplifier, and for supplying said fine information to an input of said second network, means coupling the output of said second network with the first input of said second amplifier to supply both fine and coarse analogue signals to said second amplifier;

switching means coupled with the outputs of said first and second amplifiers for providing either fine output signals or fine and coarse output signals; and output means coupled with the output of said switching means for responding to said fine and coarse analogue signals and providing said feedback signals to said first and second amplifiers.

12. A system as in claim 11 including detector means coupled with the output of said second amplifier, said detector means having an output coupled with said switching means for controlling the operation of said switching means to pass either the fine output of said first amplifier or the fine and coarse output of said second amplifier.

13. A system as in claim 11 wherein said output means includes a motor responsive to the signals from said switching means, said motor having an output shaft coupled with fine feedback means, said output shaft being coupled through gearing means to coarse feedback means, said gearing means having a ratio proportional to said ratio between said fine and coarse digital input signals, and said fine and coarse feedback means being respectively coupled to the second inputs of said first and second amplifiers.

14. A digital to analogue servosystem comprising:

conversion means for receiving digital data and providing analogue output signals, said conversion means comprising a pair of electrically weighted networks having input terminals for receiving said digital data and outputs for said analogue signals, the first of said networks serving to receive fine digital information and the second serving to receive coarse digital information, there being a predetermined electrical ratio between said fine and coarse digital information;

amplifier means connected with an output of said first network for providing a fine analogue output, the output of said amplifier means being coupled with an input os said second network, said second network having an output providing fine and coarse analogue output;

error circuit means coupled with the output of said amplifier means and said output of said second network for selectively providing a fine analogue error output or a fine and coarse analogue error output; and output means coupled with the output of said error circuit means, said output means including a motor responsive to error signals from said error circuit means, said motor having an output shaft for providing a mechanical fine analogue output, mechanical coupling means coupling said output shaft to a second shaft which provides a mechanical coarse analogue output, said mechanical coupling means providing a ratio between said two shafts proportional to said ratio between said fine and coarse digital information.

15. A system as in claim 14 wherein said output means includes fine feedback means and coarse feedback means, said fine feedback means being coupled to said output shaft and said coarse feedback means being coupled to said second shaft, said fine and coarse feedback means supplying electrical feedback signals to said error circuit means.

16. A system as in claim 14 wherein said amplifier means comprises a unity gain noninverting differential amplifier.

17. A system as in claim 16 wherein said error circuit means comprises first and second differential amplifiers, the output of said unity gain amplifier being coupled to an input of said first differential amplifier, and the output of said second network being coupled to an input of said second differential amplifier.

18. A system as in claim 17 wherein said output means includes fine and coarse feedback means respectively coupled with said two shafts, said fine and coarse feedback means providing respective feedback signals to said first and second differential amplifiers.